US012095208B2

(12) United States Patent
Mahoney

(10) Patent No.: US 12,095,208 B2
(45) Date of Patent: Sep. 17, 2024

(54) RADIO FREQUENCY (RF) CONNECTOR ASSEMBLY

(71) Applicant: Applied Optoelectronics, Inc., Sugar Land, TX (US)

(72) Inventor: William G. Mahoney, Suwanee, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 234 days.

(21) Appl. No.: 17/500,269

(22) Filed: Oct. 13, 2021

(65) Prior Publication Data

US 2023/0114839 A1 Apr. 13, 2023

(51) Int. Cl.
*H01R 24/52* (2011.01)
*H01R 13/17* (2006.01)
*H01R 13/187* (2006.01)

(52) U.S. Cl.
CPC ............. *H01R 24/52* (2013.01); *H01R 13/17* (2013.01); *H01R 13/187* (2013.01); *H01R 2201/24* (2013.01)

(58) Field of Classification Search
CPC .... H01R 24/52; H01R 13/17; H01R 2201/24; H01R 2201/04; H01R 13/187; H04Q 1/00
See application file for complete search history.

(56) References Cited

U.S. PATENT DOCUMENTS 1,928,916 A * 10/1933 John .................... H01R 13/707 200/50.29
2,531,625 A * 11/1950 Hubbell ............... H01R 13/453 200/51.09
6,094,352 A * 7/2000 Reddy .................. H05K 9/0018 361/755
6,593,830 B2 7/2003 Wu
6,811,447 B2 * 11/2004 Pfister .................... H01R 24/50 439/700
7,625,247 B1 * 12/2009 Mahoney ............. H01R 9/0527 439/700
8,047,872 B2 11/2011 Burris et al.
10,218,123 B1 * 2/2019 Mahoney ........... H01R 13/6395
10,424,424 B2 9/2019 Farrell et al.
11,456,566 B2 9/2022 Mahoney et al.
2006/0281370 A1 * 12/2006 Mahoney ........... H01R 13/2421 439/700
2021/0218182 A1 * 7/2021 Jacobson ............... H04Q 11/00

* cited by examiner

*Primary Examiner* — Travis S Chambers

(74) *Attorney, Agent, or Firm* — Grossman Tucker Perreault & Pfleger, PLLC; Norman S. Kinsella

(57) ABSTRACT

The present disclosure is generally directed to an RF connector assembly for use within a node of a broadband distribution network, and can receive a center conductor pin of a coaxial cable, e.g., via insertion by a technician, and electrically couple the center conductor pin to circuitry within the node, such as an amplifier. The RF connector assembly preferably also securely physically couples to the center conductor pin via a spring-biased arrangement (and thus by extension securely couples the coaxial cable to the housing of the node) which can supply a bias force to the center conductor pin in response to insertion of the same into the RF connector assembly. This advantageously eliminates the necessity of opening the housing of the node to couple/decouple the center conducting pin of the coaxial cable to the node.

17 Claims, 9 Drawing Sheets

RADIO FREQUENCY (RF) CONNECTOR ASSEMBLY

TECHNICAL FIELD

The present disclosure relates generally to broadband distribution networks, and more particularly, to RF connector assemblies for use in nodes of a broadband distribution network.

BACKGROUND INFORMATION

Existing coaxial connectors such as F-type and G-type RF connectors are utilized in a range of scenarios that seek to electrically connect circuitry within an enclosure, such as a printed circuit board (PCB), to a receptacle on the outside of the enclosure, which may also be referred to as an enclosure receptacle or jack. However, the world-wide adoption of such connectors has been slow and many countries, such as European countries, utilize alternative methods such as set-screws to capture/seize a coaxial cable to a node housing.

BRIEF DESCRIPTION OF THE DRAWINGS

These and other features and advantages will be better understood by reading the following detailed description, taken together with the drawings wherein.

DETAILED DESCRIPTION

Figure 1:
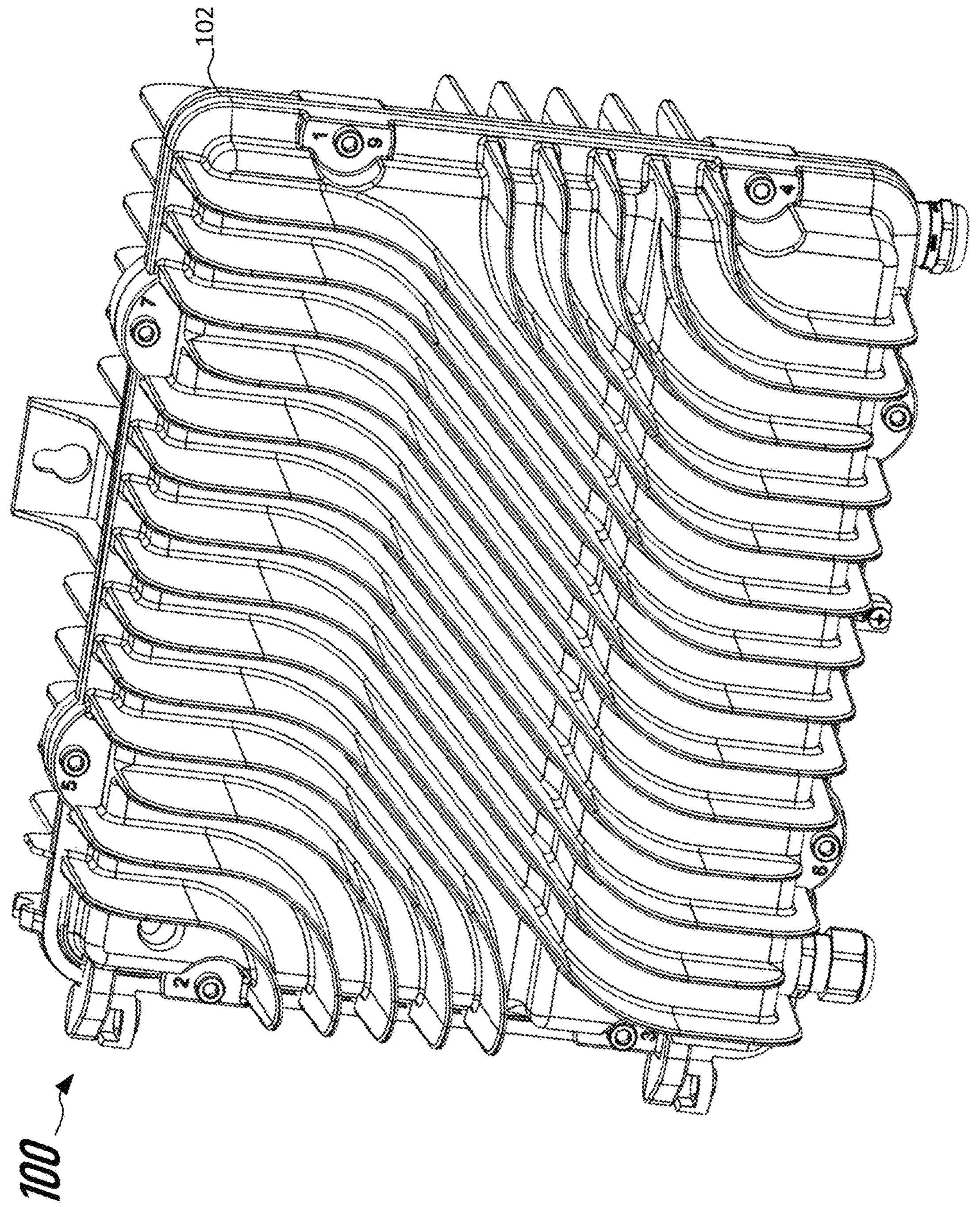
FIG. 1 shows an example distributed architecture access (DAA) node consistent with aspects of the present disclosure.

Distributed access architecture (DAA) enables the evolution of cable networks by decentralizing and virtualizing headend and network functions. DAA extends the digital portion of the headend or hub domain out to a fiber-optic node, also referred to as a DAA node, and disposes the digital-to-RF interface at the optical-coaxial boundary provided within the DAA node. In DAA, a digital fiber Ethernet link between the headend and DAA distribution nodes replaces analog optical connections, which increases the available bandwidth to service groups.

DAA-based broadband networks utilize coaxial connections at the DAA node to provide service to subscribers. Existing coaxial/radio frequency (RF) connectors utilize a set/grub-screw to capture the center conducting pin of the coaxial cables. This pin is generally provided by a stinger of the coaxial cable. This pin may also be referred to as an electrical conductor. However, this requires that the node housing be opened to provide a technician with access to the set screw for tightening/untightening purposes. In addition, this approach has additional draw backs including the metal post of the set screw arrangement acting as an antenna.

Thus, the present disclosure is generally directed to an RF connector assembly for use within a node of a broadband distribution network that can receive a center conductor pin of a coaxial cable, e.g., via insertion by a technician, and electrically couple the center conductor pin to circuitry within the node, such as an amplifier. The RF connector assembly preferably also securely (removably) couples to the center conductor pin via a spring-biased arrangement, and thus by extension securely couples the coaxial cable to the housing of the node. The spring-biased arrangement can supply a bias force to the center conductor pin in response to insertion of the center conductor pin into an alignment aperture defined by the RF connector assembly. This advantageously eliminates the necessity of opening the housing of the node to seize/capture or release the center conductor pin.

In one example, the RF connector assembly preferably includes a body having a receptacle end for coupling to a coaxial cable and a channel for receiving an electrical conductor (or center conducting pin) of the coaxial cable. The body is preferably configured to couple to a node housing, such as a DAA node housing. The receptacle end preferably defines an aperture, which may also be referred to herein as an alignment aperture, which is in communication with the channel to define at least a portion of an insertion axis for insertion of the electrical conductor into the node housing. The RF connector assembly further preferably includes a rotatable member disposed along the insertion axis and configured to rotate about an axis of rotation. The rotating member is further preferably configured to be slidably displaced along an engagement axis, with the engagement axis extending transverse relative to the insertion axis. An electrical interconnect is preferably disposed along the engagement axis such that the rotatable member can be displaced towards or away from the electrical interconnect. The electrical interconnect is preferably electrically coupled to circuitry within a node, such as an amplifier, and more preferably fixedly/securely coupled to the circuitry within the node.

The RF connector assembly further preferably includes a spring member to supply a bias force to the rotatable member in a first direction along the engagement axis (which may also be referred to herein as a first engagement direction). The first engagement direction further preferably extends towards the electrical interconnect. The channel of the body is preferably aligned with the rotatable member along the insertion axis such that insertion of the electrical conductor into the channel to a predetermined distance (e.g., in a range of 31.75 to 33.53 mm) causes the rotatable member to be displaced in a second direction along the engagement axis, with the second direction being opposite the first direction. Preferably, the rotatable member is displaced in the second direction along the engagement axis based on the electrical conductor directly engaging the outer surfaces of the rotatable member. More preferably, insertion of the electrical conductor causes the rotatable member to be displaced in the second direction along the engagement axis and to rotate about the axis of rotation.

The rotatable member is preferably configured to be displaced along the second direction via the electrical conductor based on a predetermined amount of insertion force applied to the electrical conductor from a technician, with the insertion force being preferably in a range of 3 to 4 pounds. The particular amount of insertion force to cause displacement of the rotatable member can be selected/set based on the configuration of the spring member, e.g., the spring constant. The second direction may also be referred to herein as a second engagement direction.

Movement of the rotatable member along the second direction is preferably configured to cause the spring member to compress. The compressed spring member is then preferably configured to supply a bias force to the electrical conductor by way of the rotatable member to securely couple the electrical conductor to the electrical interconnect, e.g., via friction, both physically and electrically. The rotatable member further preferably allows a technician/user to decouple the electrical conductor of the coaxial cable from the RF connector assembly by supplying a pulling force to the electrical conductor preferably in a range of 10 to 12 pounds (e.g., in a direction counter to the insertion direction) to cause the rotatable member to rotate about the axis of rotation to allow the electrical conductor pin to be withdrawn/removed from the channel and electrically decoupled from the electrical interconnect.

The term “coupled” as used herein refers to any connection, coupling, link or the like between elements. Such “coupled” elements are not necessarily directly connected to one another and may be separated by intermediate components.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated/target characteristic. To provide one non-limiting numerical example to quantify “substantially,” such a modifier is intended to include minor variation that can cause a deviation of up to and including ±5% from a particular target quality/characteristic unless otherwise provided by the present disclosure.

Referring to FIGS. 1-4, an example distributed access architecture (DAA) node 100 is shown consistent with aspects of the present disclosure. The DAA node 100 is preferably configured to be utilized within a broadband distribution network, such as a CATV network that comports with a Data Over Cable Service Interface Specification (DOCSIS) standard such as the DOCSIS 3.0 or 3.1, for example.

Figure 2:
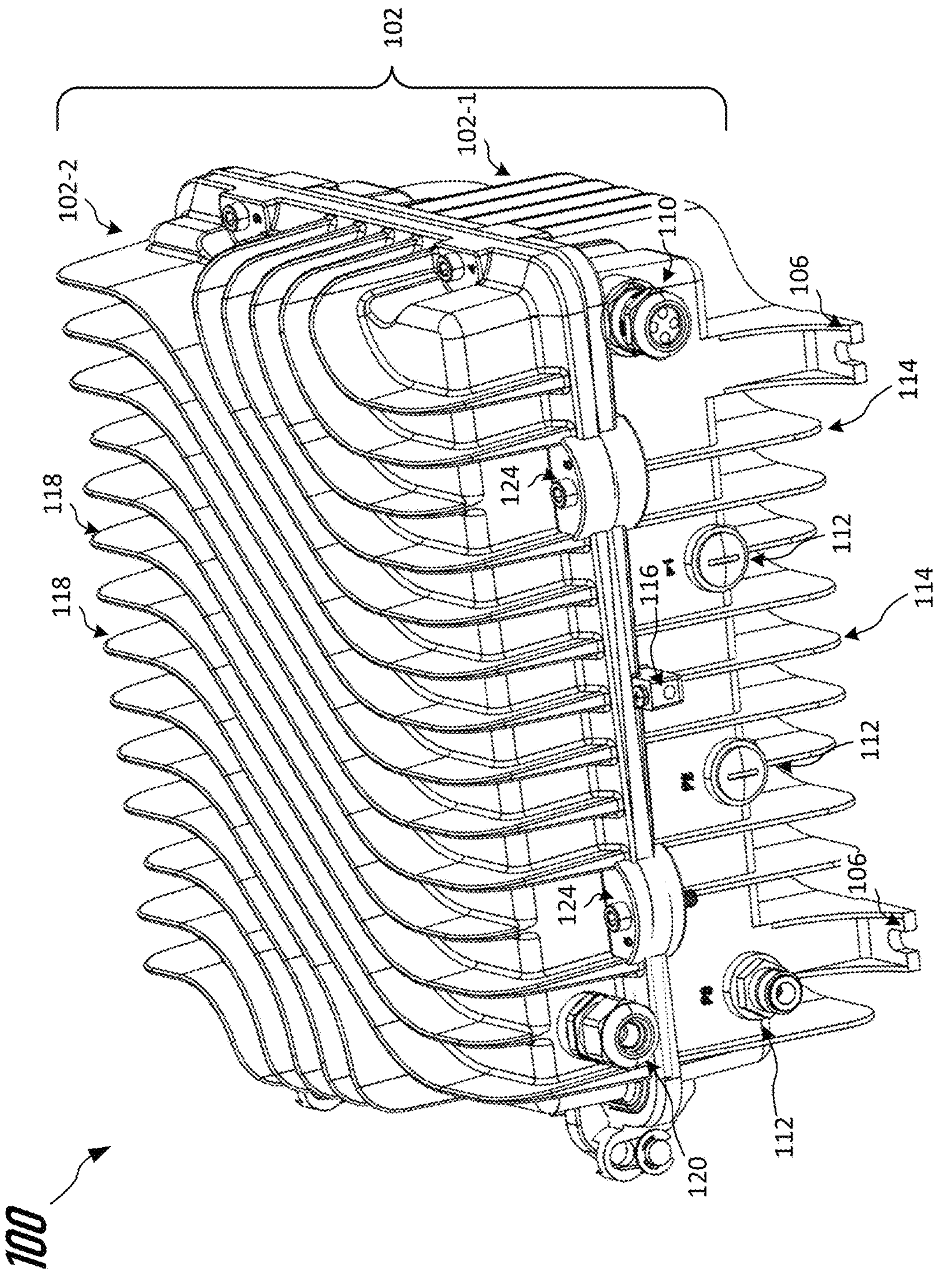
FIG. 2 shows a perspective view of the DAA node of FIG. 1, in accordance with aspects of the present disclosure.

As shown, the DAA node 100 preferably includes a housing shown collectively at 102 and individually as a first housing portion 102-1 and a second housing portion 102-2 (See FIG. 2). The housing 102 is preferably formed from a material such as aluminum. The housing 102 preferably has an ingress protection (IP) rating of IP68.

Figure 4:
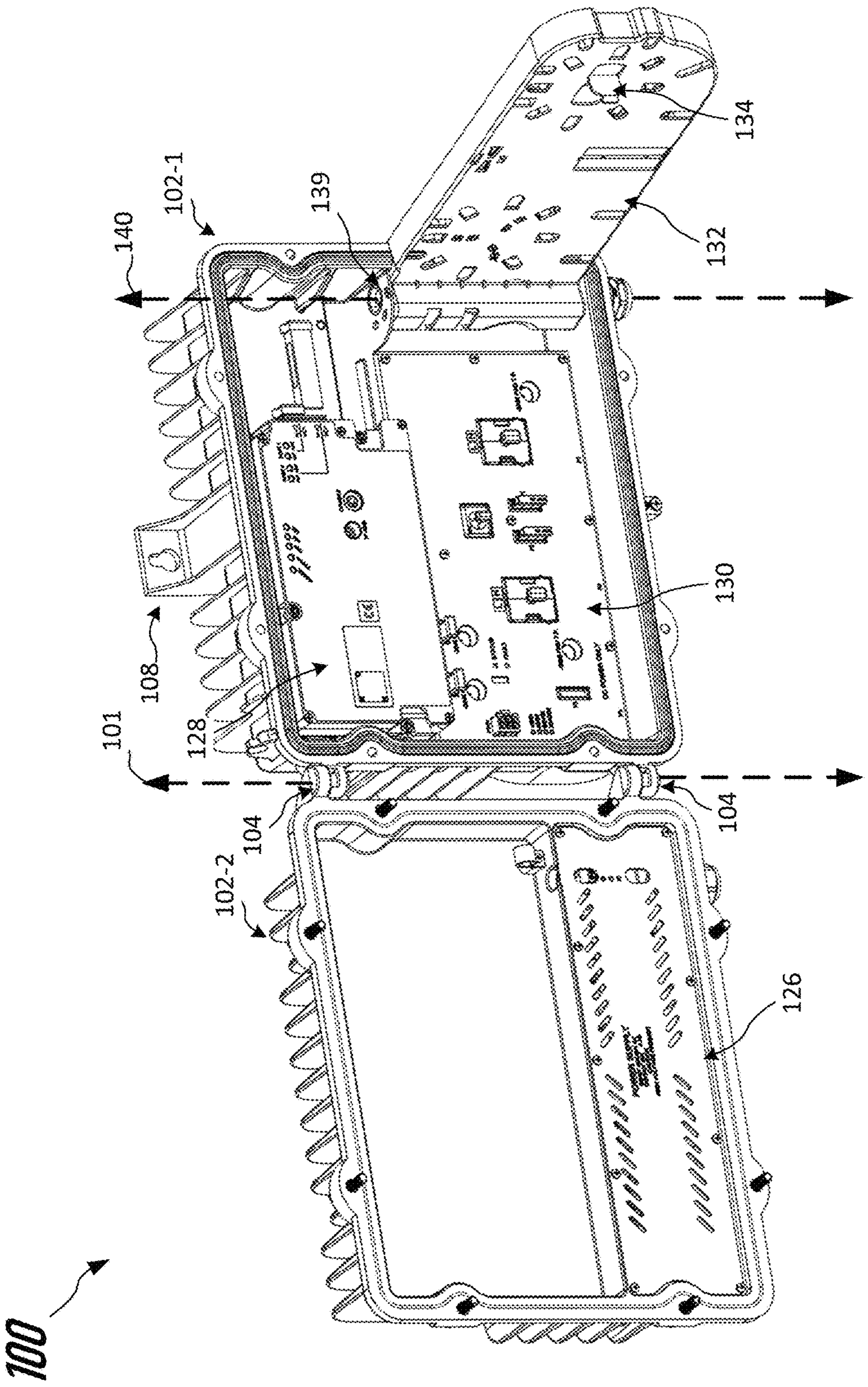
FIG. 4 shows another perspective view of the DAA node of FIG. 1, in accordance with aspects of the present disclosure.

The first housing portion 102-1 may also be referred to as a base. The first housing portion 102-1 preferably includes a plurality of mounts for fixedly mounting to a wall or other suitable structure. For example, the first housing portion 102-1 can include a plurality of bottom mounts 106 (FIG. 2) disposed opposite a top mount 108 (FIG. 4).

The first housing portion 102-1 further preferably includes at least one optical fiber receptacle 110 that is configured to couple to an optical cable having one or more optical fibers. Preferably, the least one optical fiber receptacle 110 is configured as an M16 optical fiber receptacle.

The first housing portion 102-1 further preferably includes at least one coaxial connector port, and more preferably, a plurality of coaxial connector ports 112 (FIG. 2). Each of coaxial connector port of the plurality of coaxial connector ports 112 is preferably configured to couple to a coaxial cable, e.g., by way of a stinger. The plurality of coaxial connector ports 112 may also be referred to as a plurality of radio frequency (RF) ports, cable television (CATV) RF ports, RF connector ports, or simply CATV ports. The plurality of coaxial connector ports 112 are preferably configured to couple to PG11-type RF connectors. As discussed in greater detail below, each of the plurality of coaxial connector ports 112 can be configured with an RF connector assembly consistent with the present disclosure.

Preferably, each of the plurality of coaxial connector ports 112 couple to a coaxial cable that is a feed line of the broadband network that provides data/service to one or more service groups. More preferably, each of the plurality of coaxial connector ports 112 electrically couple an electrical conductor of a coaxial cable, which may also be referred to herein as a center conducting pin or a conducting pin, to circuitry within the housing 102, such as the amplifier device 130 (See FIG. 4).

The first housing portion 102-1 further preferably defines an electrical ground terminal 116 for electrically coupling with a ground such as an earth ground.

The first housing portion 102-1 further preferably includes a plurality of fins 114 that extend therefrom. The plurality of fins 114 preferably include a curvilinear/curved profile, such as shown. The plurality of fins 114 can be configured to dissipate heat from components within the housing 102.

The second housing portion 102-2 also preferably includes a plurality of fins 118 for heat dissipation purposes. The second housing portion 102-2 further preferably defines at least one power receptacle 120 for electrically coupling with, for instance, AC mains.

Figure 5:
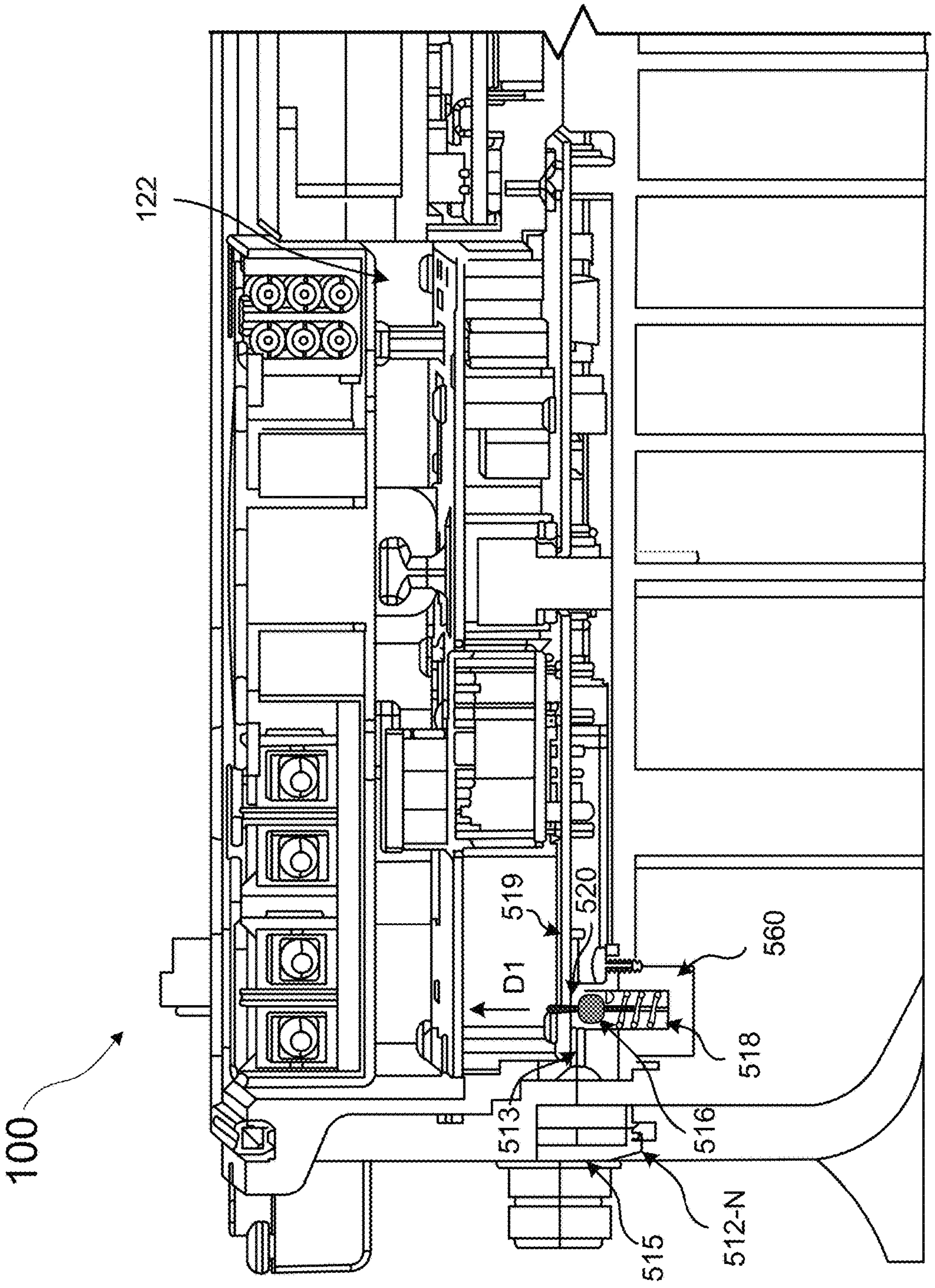
FIG. 5 shows an example cross-sectional view of the DAA node of FIG. 3 taken along line 3-3.

The first housing portion 102-1 and the second housing portion 102-2 are preferably configured to couple together and form a cavity 122 therebetween (FIG. 5). More preferably, the first housing portion 102-1 and the second housing portion 102-2 are rotatably coupled to each other via hinges 104. The hinges 104 preferably defines a first axis of rotation 101 (FIG. 4), about which the second housing portion 102-2 can rotate relative to the first housing portion 102-1.

In one example, the first housing portion 102-1 is fixedly coupled to a wall or other suitable structure (not shown), e.g., via the bottom mounts 106 and the top mount 108. In this example, the second housing portion 102-2 preferably removably couples to the first housing portion 102-1. More preferably, the second housing portion 102-2 removably couples to the first housing portion 102-1 via the hinges 104. The second housing portion 102-2 can securely couple to the first housing portion 102-1 via a latch and/or via fixation members such as bolts 124 (see FIG. 2).

Figure 3:
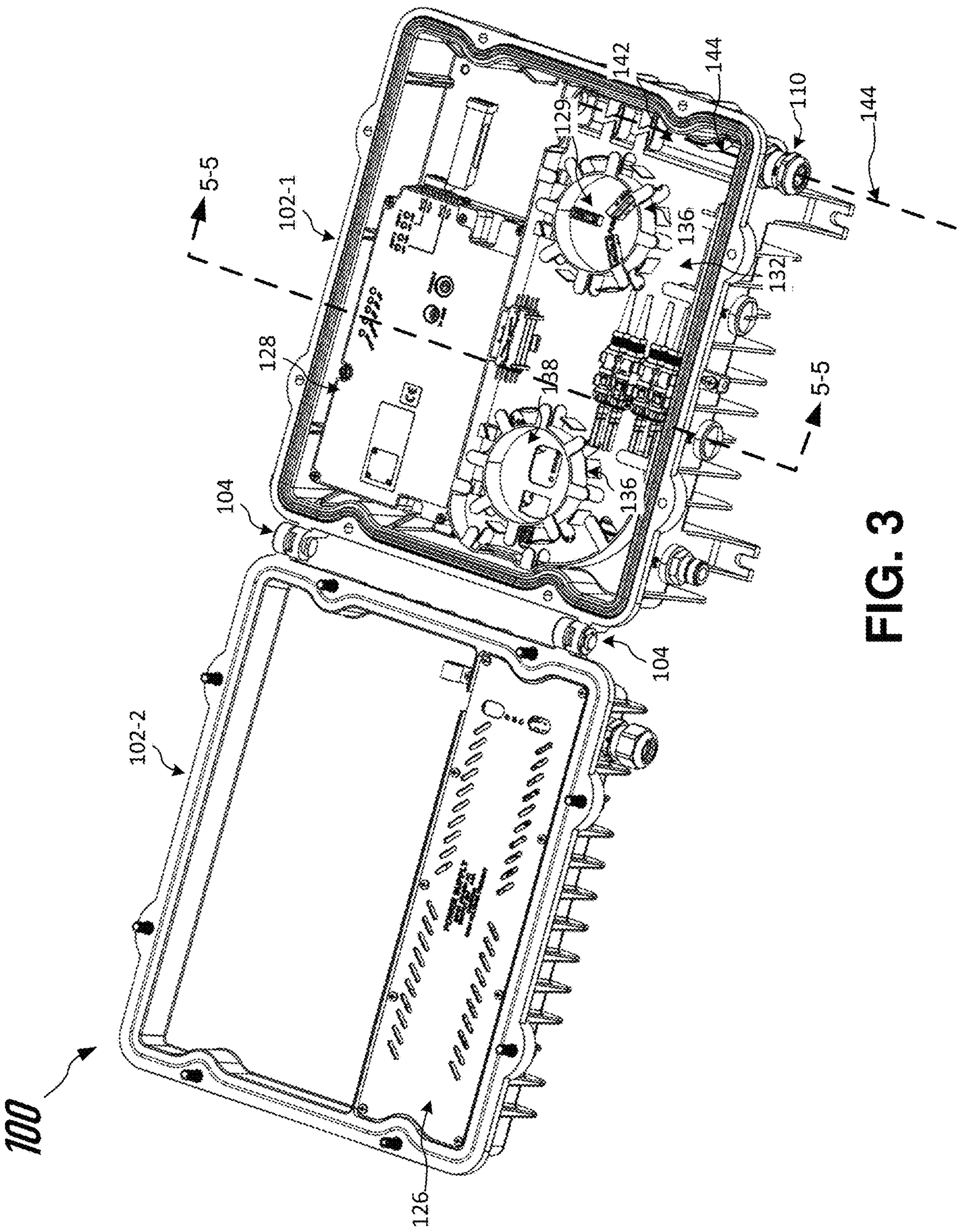
FIG. 3 shows another perspective view of the DAA node of FIG. 1, in accordance with aspects of the present disclosure.

The second housing portion 102-2 further preferably includes a power supply 126 assembly disposed therein (See FIG. 3). The power supply 126 can include power-related circuitry such as step-down converters, AC to DC converters, DC to AC converters, rectifiers, and/or filters. The power supply 126 can supply electrical power to circuitry/loads within the first housing portion 102-1. The power supply 126 can supply the power to the circuitry/loads within the first housing portion 102-1 via a conductor/wire (not shown) that extends within the cavity 122 between the first housing portion 102-1 and the second housing portion 102-2.

The first housing portion 102-1 preferably includes a plurality of components disposed therein, which may also be referred to herein as DAA circuitry or DAA components. For example, the first housing portion 102-1 preferably includes a remote PHY device (RPD) 128 (See FIG. 3).

The RPD 128 preferably includes circuitry configured to convert downstream data that is transmitted from a converged cable access platform core (CCAP core) from digital to analog, and to convert data from subscribers from analog to digital. For example, the RPD 128 can include quadrature amplitude modulation (QAM) circuitry for the downstream translation/conversion, and likewise, QAM circuitry for upstream translation/conversion.

The first housing portion 102-1 further preferably includes an amplifier device 130 disposed therein (See FIG. 4). The amplifier device 130 may also be referred to herein as an amplifier circuit or simply an amplifier. The amplifier device 130 preferably electrically couples to at least one coaxial cable that supports DAA network communication via the plurality of coaxial connector ports 112. The amplifier device 130 further preferably electrically couples with the RPD 128 to support upstream and downstream translation as discussed above.

The first housing portion 102-1 further preferably includes a fiber tray 132 (See FIG. 3). The fiber tray 132 preferably comprises a material such as polycarbonate. The fiber tray 132 further preferably defines a plurality of optical fiber reels 136. Each optical fiber reel of the plurality of optical fiber reels 136 preferably includes a radius R1, with the first radius R1 being in a range of 60 to 70 mm. The plurality of optical fiber reels 136 can be utilized for cable management purposes and to ensure that optical fiber cables (not shown) can be wound for cable management purposes in a manner that avoids the introduction of fiber bending losses. Accordingly, the particular radius R1 of the plurality of optical fiber reels 136 can vary depending on the particular optical fiber utilized within the housing 102, and more particular, based on the minimum bending radius of the particular optical fiber. In one specific example, the radius R1 is 63.5±0.5 mm.

Preferably, at least one optical fiber reel of the plurality of optical fiber reels 136 defines an opening/aperture, such as opening 138. The opening 138 can be utilized by a technician to view status lights of the amplifier device 130 and/or to access components such as fuse receptacles 129 of the amplifier device 130, for example, when the fiber tray 132 is in a closed position, e.g., latched to the first housing portion 102-1 via a latch 134 defined by the fiber tray 132 (FIG. 4).

The fiber tray 132 is preferably configured to transition between a plurality of positions, and more preferably, configured to transition between a plurality of positions via rotational movement. For example, the fiber tray 132 is preferably configured to transition from the latched (or closed) position, such as shown in FIG. 3, to one or more open positions, such as shown in FIG. 4. The fiber tray 132 can rotatably couple to the first housing portion 102-1 via a hinge arrangement 139.

The hinge arrangement 139 preferably defines a second axis of rotation 140, about which the fiber tray 132 can rotate relative to the first housing portion 102-1. Preferably, the second axis of rotation 140 extends parallel with the first axis of rotation 101, such as shown in FIG. 4.

The hinge arrangement 139 further preferably defines a channel 142 (FIG. 3). The channel 142 preferably extends along the second axis of rotation 140, and more preferably, an imaginary line 144 drawn along the center axis of rotation 140 extends concentrically with the channel 142.

The channel 142 of the hinge arrangement 139 further preferably extends concentrically with the least one optical fiber receptacle 110. Thus, the imaginary line 144 further preferably extends through a longitudinal center of the least one optical fiber receptacle 110, or at least extends concentrically with the longitudinal center line of the least one optical fiber receptacle 110. The hinge arrangement 139 can therefore allow one or more optical fibers (not shown) to extend from the least one optical fiber receptacle 110 and through the channel 142 along the imaginary line 144. This can advantageously reduce the strain on the one or more optical fibers when the fiber tray 132 is rotated to transition between the plurality of positions, such as when a technician "opens" the fiber tray 132 to access the amplifier device 130.

FIG. 5 shows an example cross-sectional view of the housing 102 of the DAA node 100 taken along line 5-5 of FIG. 3.

Each coaxial connector port of the plurality of coaxial connector ports 112 preferably includes a spring-biased RF connector assembly consistent with aspects of the present disclosure. The spring-biased RF connector assembly may also be referred to herein as a spring-biased RF seizure assembly or simply an RF connector assembly. For example, and as shown in FIG. 5, the coaxial connector port 512-N includes a spring-biased RF connector assembly 560. As discussed in further detail below, the spring-biased RF connector assembly 560 can be utilize to supply a bias force against a center conducting pin of a coaxial cable when the same is inserted into the channel 513.

The spring-biased RF connector assembly 560 can include an optional cap/plug 515 for preventing ingress of dust into the housing 102, e.g., when a particular coaxial connector port is not provisioned/configured to couple to a coaxial cable. In addition, the spring-biased RF connector assembly 560 can include a rotating member 516 and a spring member 518 that supplies a bias force against the rotating member 516 along a first direction D1. Preferably, the rotating member 516 can be slidably displaced in the first direction D1 or a second direction D2 (see FIG. 6) along the engagement axis. The axis along which the first direction D1 and the second direction D2 extend may also be referred to herein as an engagement axis. The rotating member 516 may also be referred to herein as a roller. The spring member 518 is preferably implemented as a torsion spring.

Figure 6:
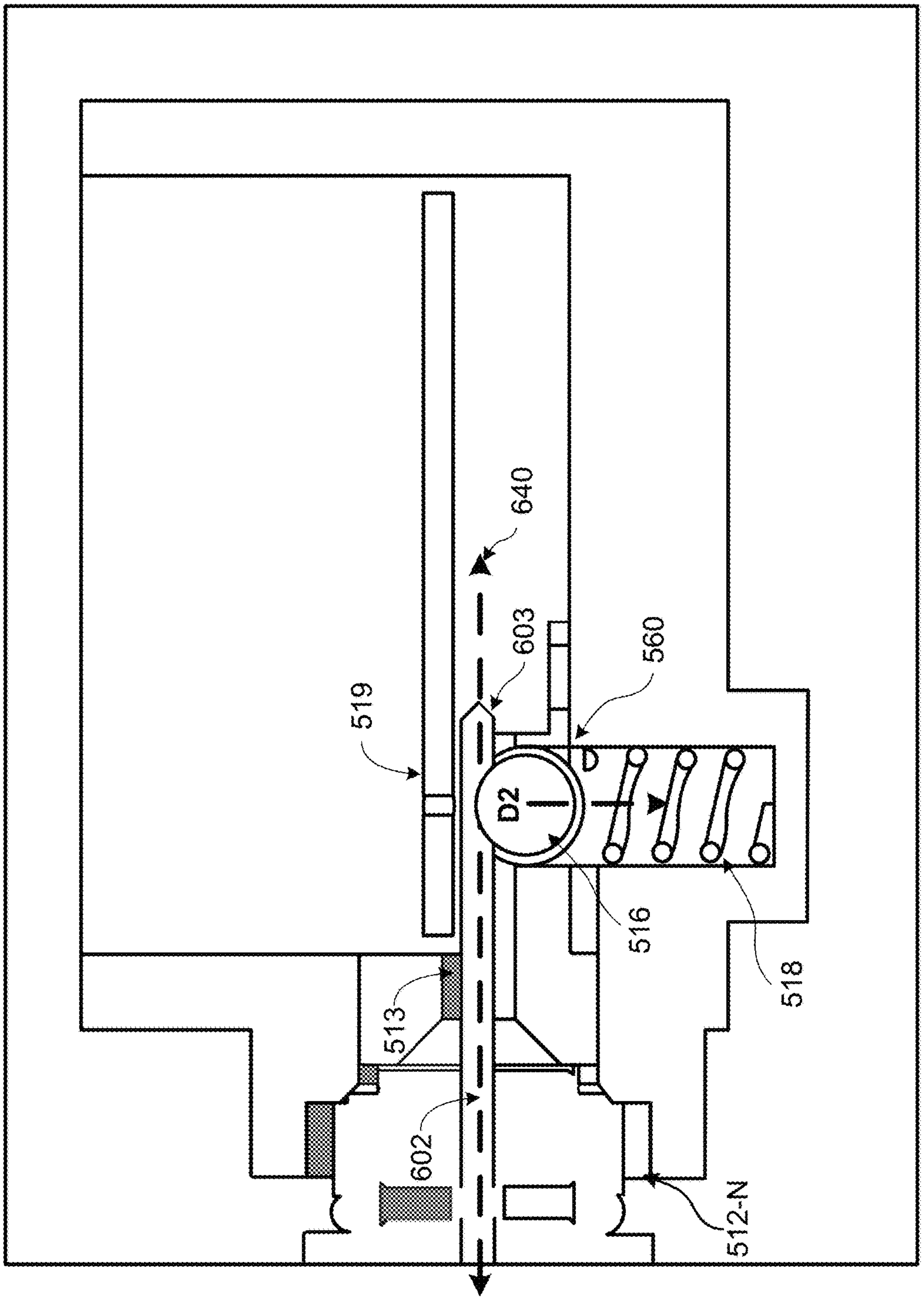
FIG. 6 shows another example cross-sectional view of the DAA node of FIG. 3 taken along line 3-3.
Figure 7A:
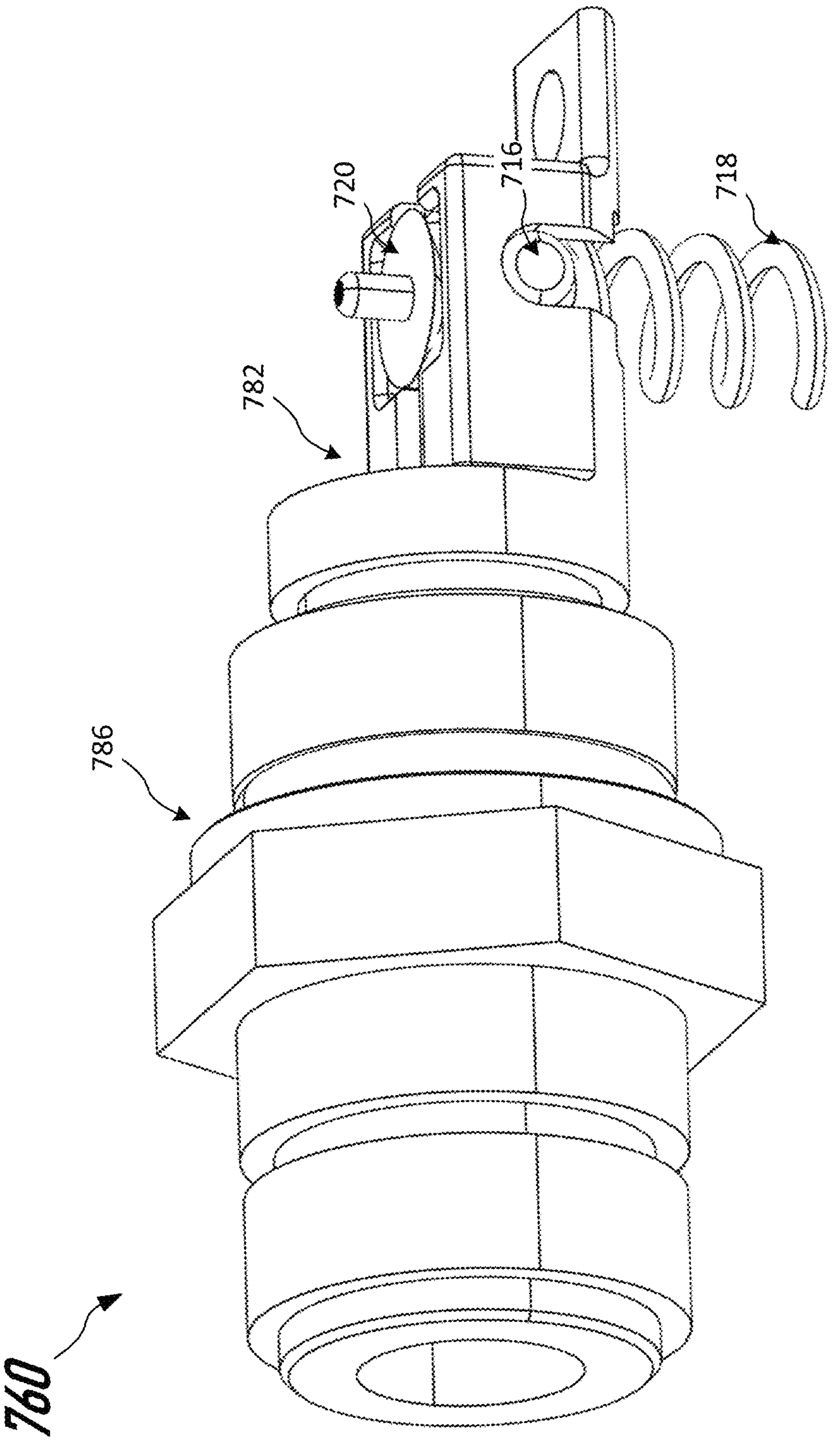
FIG. 7A shows an example RF connector assembly consistent with aspects of the present disclosure.
Figure 7B:
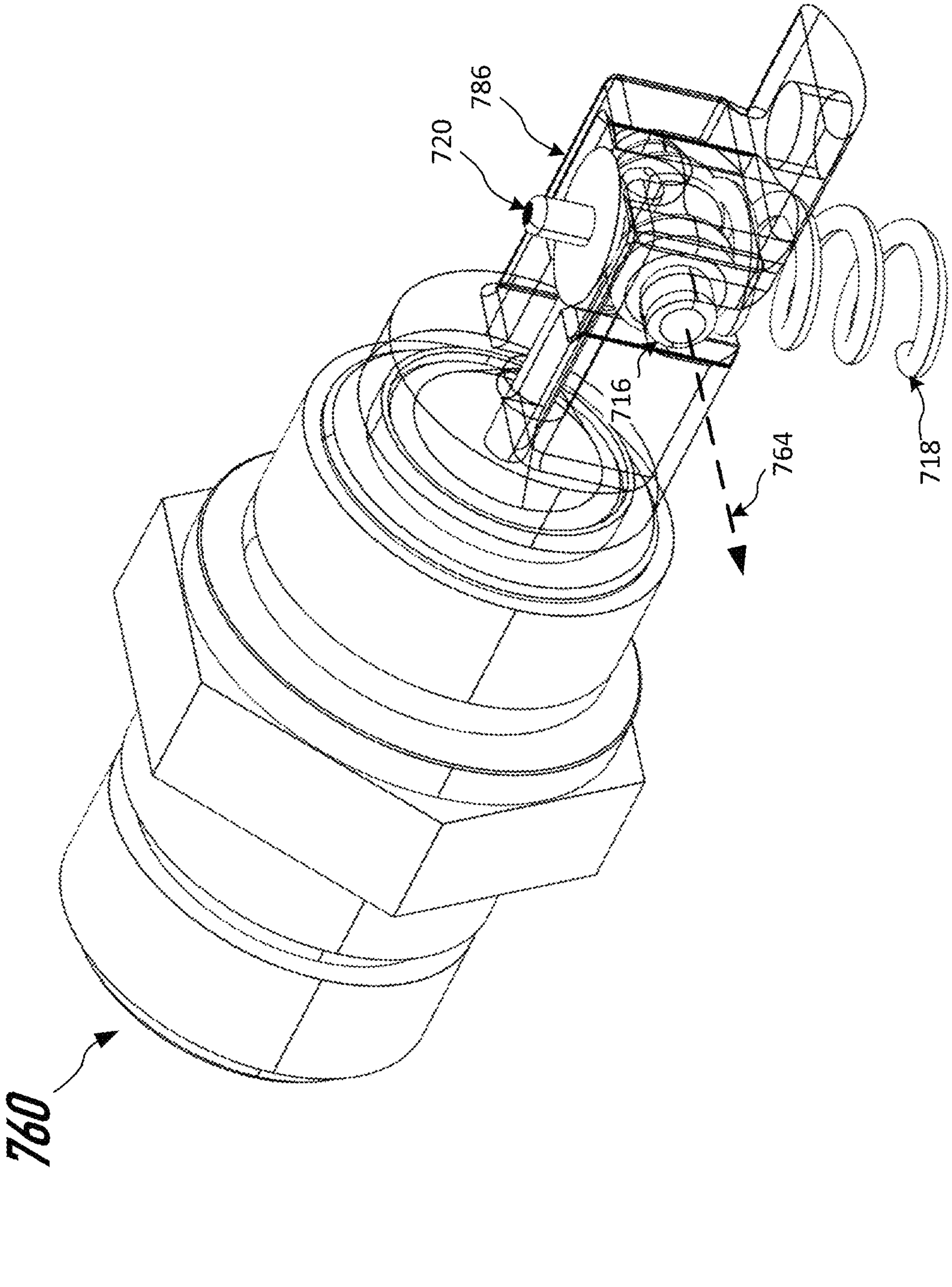
FIG. 7B shows a perspective view of the RF connector assembly of FIG. 7A, in accordance with aspects of the present disclosure.

The rotating member 516 is preferably configured to rotate about a third axis of rotation, an example of which is shown as axis of rotation 764 in FIG. 7B. The third axis of rotation preferably extends transverse with a longitudinal axis 640 of the channel 513 (See FIG. 6). The longitudinal axis 640 may also be referred to herein as an insertion axis. The longitudinal axis preferably extends transverse relative to the engagement axis for the rotating member 516. Thus, and as shown more clearly in FIG. 6, a longitudinal axis of a center conducting pin 602 can extend transverse relative to the third axis of rotation for the rotating member 516 when inserted into the channel 513.

The first direction D1 for the force supplied by the spring member 518 is preferably towards the amplifier device 130, and more particularly, a printed circuit board 519 of the amplifier device 130. An electrical interconnect 520 of the printed circuit board 519 (see FIG. 5) is preferably configured to be directly engaged by the rotating member 516 and provide a mechanical stop.

FIG. 6 shows an example cross-sectional view of the housing 102 of the DAA node 100 taken along line 5-5 of FIG. 3. As shown in FIG. 6, the channel 513 is configured to receive a center conducting pin 602 of a coaxial connector. Insertion of the pin 602 into the channel 513 is preferably configured to cause the rotating member 516 to be displaced, and preferably, displaced in a second direction (D2) that extends counter/opposite to the direction D1 shown in the example of FIG. 5.

Figure 7C:
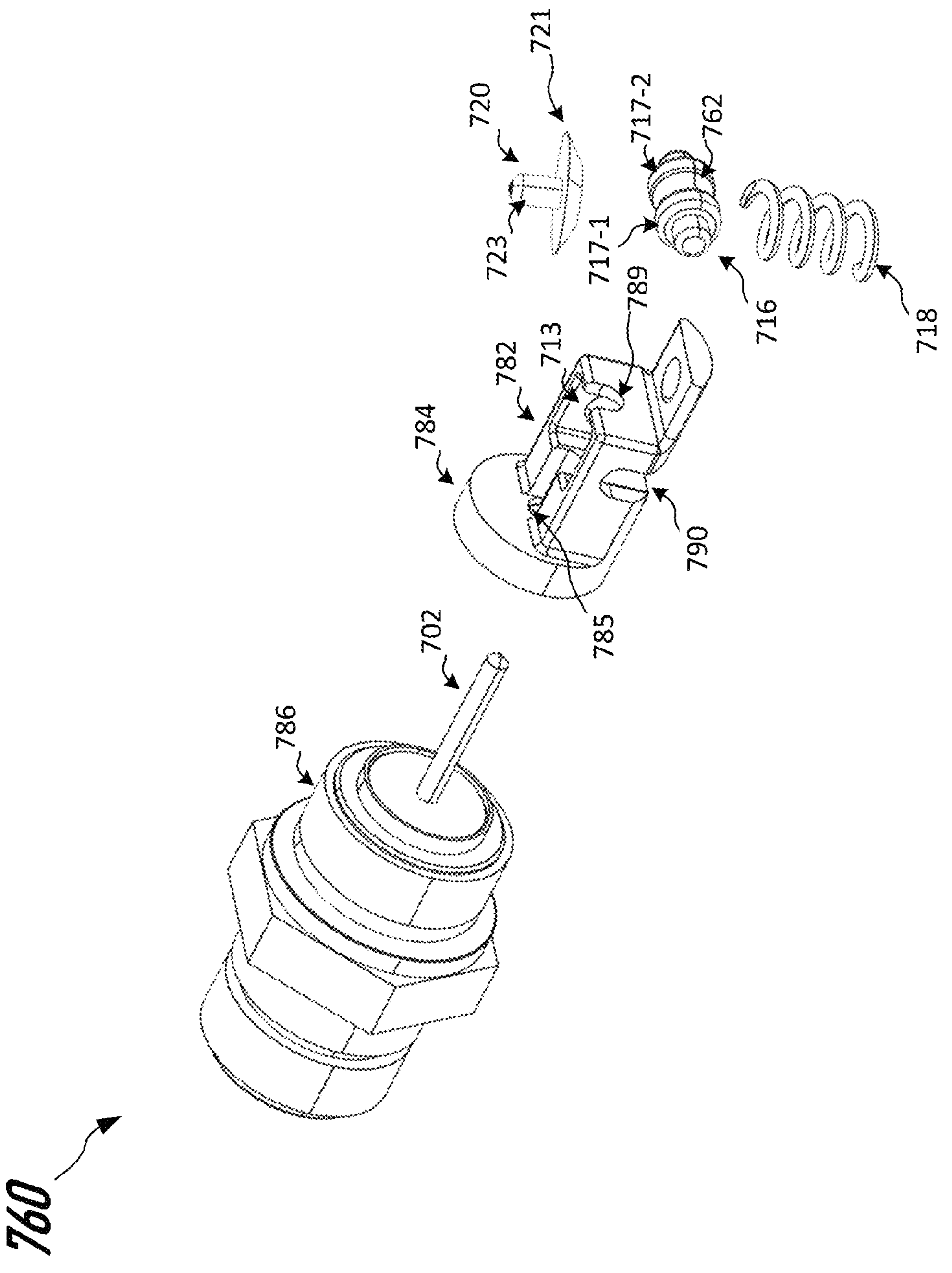
FIG. 7C shows an exploded view of the RF connector assembly of FIG. 7A, in accordance with aspects of the present disclosure.

Preferably, this displacement of the center conducting pin 602 occurs based on a distal end 603 (or tip) of the pin 602 (directly) engaging a mating surface of the rotating member 516, an example of which is shown as mating surface 762 in FIG. 7C. This engagement with the mating surface is preferably configured to cause the rotating member 516 to rotate about the third axis of rotation. Accordingly, and as shown in the example of FIG. 6, a technician can insert the center conducting pin 602 into the channel 513 and receive tactile feedback from the rotating member 516 as the same is displaced and caused to rotate about the third axis of rotation.

The spring-biased RF connector assembly 560 can therefore securely hold the center conducting pin 602 in place based on the spring member 518 supplying a bias force against the center conducting pin 602 along direction D1 (See FIG. 5) as well as provide a technician with confirmation that the center conducting pin 602 has been sufficiently inserted into the channel 513 for electrical coupling purposes with the printed circuit board 519 by way of the electrical interconnect 520 (see FIG. 5).

FIGS. 7A-7C show an example spring-biased RF connector assembly 760 consistent with aspects of the present disclosure. The spring-biased RF connector assembly 760 can be configured substantially similar to the spring-biased RF connector assembly 560 discussed above, the aspects and features of which are equally applicable to the spring-biased RF connector assembly 760 and will not be repeated for brevity. Preferably, the spring-biased RF connector assembly 760 is implemented as the spring-biased RF connector assembly 560 within each of the plurality of coaxial connector ports 112 of the DAA node 100 as discussed above.

As shown, the spring-biased RF connector assembly 760 preferably includes a body 782, a rotatable member 716, a spring member 718, and an electrical interconnect 720.

The body 782 may also be referred to herein as a connector body or a mating body. The body 782 is preferably formed from a dielectric material with a dielectric constant equal to or less than 3.0, and more preferably, a dielectric constant equal to or less than 2.02. In one example, the dielectric material forming the body 782 is polytetrafluoroethylene (PTFE), and more preferably solid PTFE which has a dielectric constant of 2.02. However, the body 782 can be formed from a range of materials including polymers. The body 782 is preferably formed from a single, monolithic piece of material.

The body 782 preferably includes a receptacle end 784 at a first end. The receptacle end 784 preferably includes a cylindrical shape. At least a portion of the receptacle end 784 can extend from a DAA housing when disposed therein, such as shown in the example of FIG. 2. The receptacle end 784 preferably includes an aperture 785 to receive a cap, such as the plug 515 (FIG. 5), or to receive a center conducting pin 702 of a coaxial connector 786 (which may also be referred to herein as a coaxial stinger or simply a stinger).

The body 782 further preferably defines a channel 713. The channel 713 preferably extends in parallel with the longitudinal axis 640 (See FIG. 6). The aperture 785 preferably communicates with the channel 713 to allow the center conducting pin 702 to extend into the channel 713. An alignment slot 789 is preferably defined at a distal end of the body 782 relative to the receptacle end 784. The alignment slot 789 preferably includes an arcuate profile, such as shown. The channel 713 and alignment slot 789 are preferably disposed along an insertion axis (see longitudinal axis 640 of FIG. 6) and are configured to operate as a guide to ensure that the center conducting pin 702 aligns with and engages the mating surface 762 of the rotatable member 716. More preferably, the channel 713 and alignment slot 789 are configured to ensure that the center conducting pin 702 travels along a path that causes the center conducting pin 702 to be disposed between the rotatable member 716 and the electrical interconnect 720 when inserted into the channel 713.

This advantageously reduces the potential for a bend in the center conducting pin 702 to cause the same to extend between the rotatable member 716 and the spring member 718, or otherwise be inserted in a manner that prevents electrical communication with the electrical interconnect 720.

The body 782 further preferably defines a transaxial notch 790. The transaxial notch 790 preferably extends substantially transverse relative to the channel 713. The transaxial notch 790 is preferably configured to receive at least a portion of the rotatable member 716. The transaxial notch 790 further preferably defines the axis of rotation 764 (or third axis of rotation).

The transaxial notch 790 is further preferably configured to provide a guide/track and allow for the rotatable member 716 to be slidably displaced by the spring member 718 along the direction D1 (see FIG. 5) in an absence of the center conducting pin 702, and slidably displaced by the center conducting pin 702 along the direction D2 (See FIG. 6) when the center conducting pin 702 is inserted between the rotatable member 716 and the electrical interconnect 720.

The rotatable member 716 preferably includes a substantially cylindrical shape, which is more clearly shown in the example of FIG. 7C. The rotatable member 716 preferably comprises a dielectric material with a dielectric constant equal to or less than 3.0, and more preferably, a dielectric constant equal to or less than 2.02. The rotatable member 716 can comprise a range of materials including a polymer. In one example, the dielectric material forming the rotatable member 716 is polytetrafluoroethylene (PTFE), and more preferably solid PTFE which has a dielectric constant of 2.02.

The rotatable member 716 preferably defines the mating surface 762. The mating surface 762 preferably extends around the entire circumference of the rotatable member 716. The mating surface 762 is preferably a recessed/concave surface. The recessed/concave surface of the mating surface 762 is preferably defined at least in part by first and second annular projections 717-1, 717-2 which are disposed on opposite sides of the mating surface 762. The first and second annular projections 717-1, 717-2 can provide a mechanical guide to ensure that the center conducting pin 702 remains therebetween, and more specifically, aligned with the mating surface 762 for engagement purposes.

The electrical interconnect 720 preferably comprises a metal or other electrically conductive material. The electrical interconnect 720 is preferably formed from a single, monolithic piece of material. The electrical interconnect 720 preferably includes a base 721. The base 721 preferably includes a frustoconical shape/profile. The electrical interconnect 720 further preferably includes an electrical conductor 723 extending from the base 721, which may also be referred to as an electrical conductor post. The electrical conductor 723 is preferably configured to extend through an aperture of a printed circuit board, such as the printed circuit board 519 (See FIG. 5).

In accordance with an aspect of the present disclosure a radio frequency (RF) connector assembly for use in a broadband distribution network is disclosed. The RF connector assembly to electrically couple a coaxial cable to circuitry within a housing of a node of the broadband distribution network, the RF connector assembly comprising a body having a receptacle end for coupling to the coaxial cable and a channel for receiving an electrical conductor of the coaxial cable, a rotatable member configured to rotate about an axis of rotation and be slidably displaced along an engagement axis, the engagement axis being transverse to the axis of rotation, a spring member to supply a bias force to the rotatable member in a first direction along the engagement axis, and wherein the channel of the body is aligned with the rotatable member to cause the rotatable member to be displaced in a second direction based on insertion of the electrical conductor of the coaxial cable into the channel, the second direction being opposite the first direction.

In accordance with another aspect of the present disclosure a distributed access architecture (DAA) node is disclosed. The DAA node comprising a housing, an amplifier disposed in the housing, at least one coaxial connector port coupled to the housing for electrically coupling the amplifier to a coaxial cable that provides a feed line of a broadband network, the at least one coaxial connector port comprising a body having a receptacle end for coupling to the coaxial cable and a channel for receiving an electrical conductor of the coaxial cable, a rotatable member configured to rotate about an axis of rotation and be slidably displaced along an engagement axis, the engagement axis being transverse to the axis of rotation, a spring member to supply a bias force to the rotatable member in a first direction along the engagement axis, and wherein the channel of the body is aligned with the rotatable member to cause the rotatable member to be displaced in a second direction along the engagement axis based on insertion of the electrical conductor of the coaxial cable into the channel, the second direction being opposite the first direction.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A radio frequency (RF) connector assembly for use in a broadband distribution network, the RF connector assembly to electrically couple a coaxial connector to circuitry within a housing of a node of the broadband distribution network, the RF connector assembly comprising:

a body having a receptacle end for coupling to the coaxial connector and a channel for receiving a center conducting pin of the coaxial connector;

a rotatable member configured to rotate about a single axis of rotation and be slidably displaced along an engagement axis, the engagement axis being transverse to the axis of rotation, wherein at least a portion of the rotatable member has a cylindrical shape such that the rotatable member only rotates about the single axis of rotation, the rotatable member including a mating surface configured to be engaged by the center conducting pin of the coaxial connector to cause rotation of the rotatable member about the single axis of rotation, wherein the rotatable member includes annular projections defining the mating surface between the annular projections, and wherein the mating surface is configured to provide a mechanical guide for the center conducting pin;

a spring member to supply a bias force to the rotatable member in a first direction along the engagement axis; and wherein the channel of the body is aligned with the mating surface of the rotatable member, and wherein the mating surface is further configured to be engaged by the center conducting pin of the coaxial connector to cause the rotatable member to be displaced in a second direction opposite the first direction.

2. The RF connector assembly of claim 1, wherein, the receptacle end defines an aperture to receive the center conducting pin of the coaxial connector into the channel.

3. The RF connector assembly of claim 1, wherein the channel defines an insertion axis for insertion of the center conducting pin into the channel, the insertion axis being transverse relative to the engagement axis of the rotatable member.

4. The RF connector assembly of claim 1, further comprising an electrical interconnect to electrically couple with the circuitry within the housing of the node, and wherein the body further defines an alignment slot aligned with the mating surface of the rotatable member, the alignment slot is configured to guide the center conducting pin of the coaxial connector along a path that causes the center conducting pin of the coaxial connector to be disposed between the electrical interconnect and the mating surface of the rotatable member.

5. The RF connector assembly of claim 1, wherein the mating surface is a concave surface.

6. The RF connector assembly of claim 1, wherein the body defines a transaxial notch, the transaxial notch extending transverse relative to the channel.

7. The RF connector assembly of claim 6, wherein the transaxial notch is configured receive the rotatable member and allow the rotatable member to be slidably displaced along the engagement axis.

8. The RF connector assembly of claim 1, wherein the body is formed of a first material, the first material having a dielectric constant equal to or less than 2.02.

9. The RF connector assembly of claim 1, wherein the rotatable member is formed of a second material, the second material having a dielectric constant equal to or less than 2.02.

10. A distributed access architecture (DAA) node comprising:

a housing;

an amplifier disposed in the housing;

at least one coaxial connector port coupled to the housing for electrically coupling the amplifier to a coaxial connector that provides a feed line of a broadband network, the at least one coaxial connector port comprising:

a body having a receptacle end for coupling to the coaxial connector and a channel for receiving a center conducting pin of the coaxial connector;

a rotatable member configured to rotate about a single axis of rotation and be slidably displaced along an engagement axis, the engagement axis being transverse to the axis of rotation, wherein at least a portion of the rotatable member has a cylindrical shape such that the rotatable member only rotates about the single axis of rotation, the rotatable member including a mating surface configured to be engaged by the center conducting pin of the coaxial connector to cause rotation of the rotatable member about the single axis of rotation, wherein the rotatable member includes annular projections defining the mating surface between the annular projections, and wherein the mating surface is configured to provide a mechanical guide for the center conducting pin;

a spring member to supply a bias force to the rotatable member in a first direction along the engagement axis; and wherein the channel of the body is aligned with the mating surface of the rotatable member, and wherein the mating surface is further configured to be engaged by the center conducting pin of the coaxial connector to cause the rotatable member to be displaced in a second direction opposite the first direction.

11. The DAA node of claim 10, wherein the channel extends along an insertion axis for insertion of the center conducting pin of the coaxial connector, the insertion axis being transverse relative to the engagement axis of the rotatable member.

12. The DAA node of claim 10, wherein the receptacle end of the body defines an aperture to receive the center conducting pin of the coaxial connector into the channel.

13. The DAA node of claim 10, wherein the at least one coaxial connector port comprises an electrical interconnect to electrically couple the center conducting pin to the amplifier, and wherein the body further defines an alignment slot aligned with the mating surface of the rotatable member, the alignment slot is configured to guide the center conducting pin of the coaxial connector along a path that causes the center conducting pin of the coaxial connector to be disposed between the electrical interconnect and the mating surface of the rotatable member and electrically couple to the electrical interconnect.

14. The DAA node of claim 10, wherein the mating surface of the rotatable member is a recessed surface.

15. The DAA node of claim 10, wherein the body defines a transaxial notch, the transaxial notch extending transverse relative to the channel, and wherein the transaxial notch is configured receive the rotatable member and allow the rotatable member to be slidably displaced along the engagement axis.

16. The RF connector assembly of claim 1, wherein the mating surface is a recessed surface.

17. The DAA node of claim 10, wherein the mating surface is a concave surface.

* * * * *